July 24, 1956 P. T. GILBERT, JR 2,756,203
GLASS ELECTRODES
Filed March 17, 1953
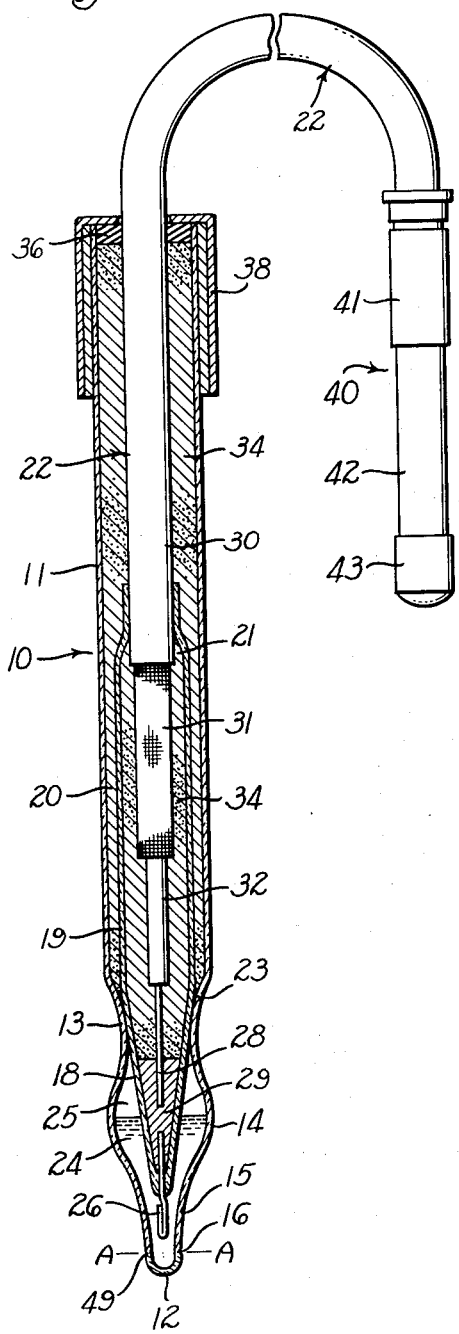
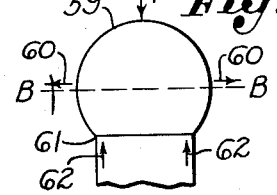
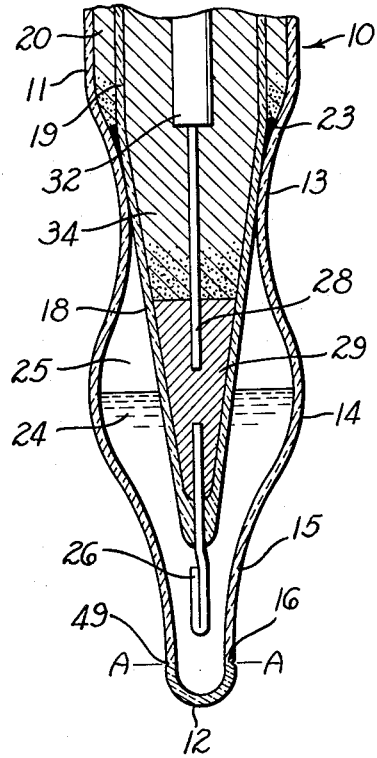
INVENTOR.
PAUL T. GILBERT, JR.
BY HIS ATTORNEYS.
HARRIS, KIECH, FOSTER & HARRIS
By Lawrence F. Kiech

United States Patent Office 2,756,203
Patented July 24, 1956

2,756,203

GLASS ELECTRODES

Paul T. Gilbert, Jr., South Pasadena, Calif., assignor to Beckman Instruments, Inc., South Pasadena, Calif., a corporation of California Continuation of application Serial No. 112,106, August 24, 1949. This application March 17, 1953, Serial No. 342,785

11 Claims. (Cl. 204—195)

My invention relates to glass electrodes for pH measurements and more particularly to glass electrodes of novel shape which are extremely sturdy and capable of many new uses.

Conventional glass electrodes are formed with a tubular stem on the terminal end of which is blown a bulbous pH-sensitive membrane. In such conventional glass electrodes the bulbous membranes, hereinafter referred to as bulbs, have been substantially spherical and of a diameter larger than the terminal end of the glass stem. The "sphericity" of such bulbs (defined herein as the ratio of the external area of the bulb to that of a sphere of the same diameter or the ratio of the altitude of the bulb to its diameter) is conventionally .80–.90 and sometimes as high at .95.

Even with extremely sensitive pH meters and with electrode glasses of relatively low resistance, e. g., about $3 \times 10^{10}$ ohm-cm. at 25° C., the bulbs must be of an average thickness not exceeding 0.1–0.2 mm. for spherical bulbs of 1 cm. diameter, depending partially upon the temperature of use. Such bulbs will generally break under a pressure of 2–20 lbs. exerted by a flat surface forced against the bulb end. Additionally, they are easily cracked by sudden shock or by scratches. In the blowing of such bulbs, the extreme end of the bulb is usually found to be thinner than portions of the spherical bulb near the point of attachment to the glass stem, thus increasing the frailness of the bulb.

There has existed a need for a glass electrode that could withstand end pressures of up to 70–100 lbs. or more; also, for electrodes in which the area of the pH-sensitive glass is very small. For example, glass electrodes capable of withstanding such pressure would be useful in measuring the pH of semisolid media or of solid surfaces, e. g., soils, foods, and textiles. Glass electrodes having small bulbs, typically 3–5 mm. diameter, would be useful in determining the pH of deformable surfaces, such as those of skin or leather, by direct contact therewith and without the application of intermediate fluids. Bulbs of even smaller diameter, typically less than 1 mm. up to about 2 mm. are desirable for measuring highly localized pH values, as in studies of a biological nature. Small and sturdy electrode bulbs would also be desirable in the testing of the pH of blood in vivo, for insertion into the stomach, in studying the pH of the nasal mucosa or for insertion in the vaginal tracts of small mammals. Electrode bulbs having a diameter of about 1 mm. or less can also be used for actual penetration of tissues, whether or not sheathed in a steel cannula.

Many of such problems are so severe that no prior attempts have been made to solve them. In other instances, attempts at solution have been made along the line of protecting the thin and fragile spherical bulbs by special armor. Such attempts have been largely unsuccessful and any attempted solutions of the problem by the use of sharp-pointed conical membranes or spherical bulbs protected by armor have resulted in electrodes unduly expensive to fabricate or unduly bulky, the resulting electrodes requiring contact with the medium to be measured over an extensive area.

It is an object of the present invention to provide a glass electrode which is virtually unbreakable. The preferred glass electrodes of the invention have pH-sensitive membranes which will not break under pressure or impact prior to the breakage of the stem itself.

Another object of the invention is to provide a glass electrode which will withstand static pressure of up to 70–100 lbs. or more and which can be dropped, tip down, from a height of several feet onto a relatively hard surface without probability of selective breakage of the blown pH-sensitive portion of the bulb.

Another object of the invention is to provide extremely sturdy electrodes suitable for penetrating solid or semisolid media and to provide electrodes which can be constructed of extremely small size, having an exceptionally small area of contact useful for penetration or deformation of surfaces in the measuring of highly localized pH values.

A further object of the invention is to provide a glass electrode sufficiently sturdy to be used as a stirring rod in laboratory experiments and while simultaneously taking pH measurements of the solution being stirred. Glass electrodes of such sturdiness were heretofore unknown. With conventional glass electrodes care must be exercised even to prevent contact with the container holding the solution and any breakage of the electrode results in contamination of a batch of often-valuable material by electrode glass or by the electrolyte normally within the electrode. The glass electrodes of the present invention can be used in laboratory procedures as freely as a stirring rod, without danger of breakage.

Conventional commercial glass electrodes with spherical bulbs invariably provide a constricted portion or neck at or above the bulb-stem junction which is substantially smaller than the bulb. This gives rise to an exposed upper surface of the blown portion comprising the pH-sensitive membrane, this exposed upper surface extending inwardly to the narrower neck of the stem as a segment of a sphere. I have found that the presence of such an exposed upper surface materially weakens the electrode and forms a shelf-like projection subject to contamination and difficult to clean and dry. It is an object of the invention substantially to eliminate any such exposed upper surface by providing a glass electrode in which the sphericity of the total blown bulbous portion, produced when blowing the pH-sensitive membrane, is not in excess of about .65, the elimination of such exposed upper surface thus facilitating cleansing and drying of the electrode between immersions in different media and increasing the strength of the electrode to an unexpected degree while also promoting precision of measurement.

The present invention solves the above-mentioned problems and makes possible the attainment of the aforesaid objects by providing a substantially hemispherical dome or membrane attached to a stem of substantially the same terminal diameter. By a substantially hemispherical dome, I have reference to a dome shaped to have a "sphericity" of about .4 up to .65. The "sphericity" of a dome, as the term is herein used, is defined as the ratio of the external area of the dome to that of a sphere or spheroid of the same diameter or radius of curvature or the ratio of the altitude of the dome to its diameter, the altitude being measured perpendicularly from the base zone of the dome to its tip. The invention thus contemplates the use of pH-sensitive domes or membranes ranging from slightly less than hemispherical form to slightly more than hemispherical form. As the sphericity increases, beyond hemispheric form, the strength of the dome progressively decreases and at sphericities greater than .65 the marked advantages of the invention are not commercially significant. I prefer domes of a sphericity no greater than .65, the strongest commercially satisfactory electrodes having dome sphericities less than or not greatly exceeding a hemisphere, e. g., sphericities not exceeding about .55, although excellent and amazingly strong commercial electrodes can be produced with sphericities up to about .60 or up to about .65.

It is an object of the invention to provide such a substantially hemispherical dome formed of pH-sensitive electrode glass and attached to the terminal end of a tubular stem formed of dissimilar glass, the zone of attachment being immediately adjacent the base of the substantially hemispherical dome.

A further object is to provide surface discontinuity of such zone of attachment. For example, on one side of such zone the dome is a section of a sphere and on the other side of the zone the tubular stem provides a terminal portion of a shape other than a smooth continuation of such spherical section of the dome.

It is a further object in some embodiments of the invention to provide a glass electrode in which the pH-sensitive surface is formed of an electrode glass in the form of a hollow dome attached to a tubular stem, the terminal portion of which provides a surface substantially tangent to the dome adjacent the zone of attachment.

A further object of the invention is to provide a glass electrode having a substantially hemispherical dome of a diameter as small as or smaller than 1 mm. up to several mm., typically up to 1 cm., and having a thickness of about .05–.5 mm., preferably about .1–.25 mm. Within these ranges, the preferred commercial electrodes have membranous domes that are segments of spheres of a diameter of about 1–8 mm., with thicknesses of about .1–.2 mm.

A further object of the invention is to provide a glass electrode in which the pH-sensitive surface is of very small diameter and is blown on a larger stem tapering to the diameter of the dome comprising the pH-sensitive surface.

Further objects and advantages of the invention will be evident to those skilled in the art from the following description of exemplary embodiments and from the drawing in which:

Fig. 1 is a vertical sectional view, very substantially enlarged, of one embodiment of the invention;

Fig. 2 is a view, enlarged even further, showing the lower end of the electrode of Fig. 1 with a dome having a sphericity of about .6; and Figs. 3A and 3B are diagrammatic views suggestive of forces in prior electrodes and in electrodes of the invention.

In Fig. 1 is illustrated a complete penetrating-type electrode assembly including a glass electrode 10 comprising a two-part envelope composed of a tubular stem 11 with a cupped membrane or dome 12 fused thereto and preferably blown thereon.

The stem 11, illustrated for purpose of example, is preliminarily formed to provide a body portion having a restricted portion or collar 13 and a bulbous or enlarged portion 14. A neck portion 15 tapers inwardly from the body portion to a terminal portion 16, the latter being illustrated as almost cylindrical to provide an external surface which is substantially tangent to the external surface of the bulb 12. The terminal portion 16 terminates in an annular surface lying substantially in a plane A—A and the dome 12 provides a base or base zone fused to the annular terminal surface in this plane. Correspondingly, the line A—A represents a junction plane or junction zone where the electrode glass of the bulb 12 joins and is fused to the terminal portion of the glass stem.

The inner surface of the collar 13 is ground and receives a tapered tip 18 of a plug member 19 which extends upwardly within the stem 11 to provide an annular space 20 between the plug member 19 and the stem 11 and an annular space 21 between the plug member and a shielded cable 22, the plug member 19 being shown as having a constricted upper end contacting the cable 22 to close the upper end of the annular space 21. The exterior of the tapered plug 18 is locally ground to fit the collar 13 and a suitable sealing substance 23 is employed to seal the junction, the sealing substance being typically a styrene cement.

Sealed within the enlarged portion 14 is a solution or electrolyte 24 of suitable composition. The electrolyte fills the enlarged portion 14 only partially to leave an air space 25.

A suitably coated platinum wire 26 is sealed in the end of the tip 18 to be submerged by the electrolyte. Also, a copper lead or conductor 28 of the shielded cable 22 depends in the tapered tip 18 but terminates short of the platinum wire 26. To join these elements electrically, the lower interior of the tip 18 is filled with a body of solder 29.

The shielded cable 22 provides an outer layer of rubber insulation 30 which is cut back to expose a braided metallic shield 31 which is exposed within the upper end of the plug member 19. This braided shield is cut back to expose an inner layer of rubber insulation 32, the latter being in turn cut back to expose the conductor 28.

The annular spaces 20 and 21 are filled with a suitable filling substance, such as a low melting wax 34. At the extreme upper end of the stem 11, a gasket 36 and a suitable cap 38 telescope with the upper end of the stem and provide an annular space therearound which is filled with a suitable filling material.

The shielded cable 22 extends to a remote terminal plug 40 including a bushing 41 electrically connected to the braided shield 31 and serving to ground same at the terminal position. The inner layer of rubber insulation 32 extends along a glass tube 42, the conductor 28 being exposed within and connected to a terminal or cap 43 which serves to transmit to the measuring instrument the potential of the electrolyte 24. If the glass electrode is dipped into a solution, a difference in potential will be established between the electrolyte 24 and the solution, this difference in potential being a function of the hydrogen ion concentration or pH of the solution. The terminal plug 40 may be plugged into suitable measuring or recording equipment responsive to this potential difference in producing an indication or record of the pH of the solution.

The small hemispherical dome 12 is preferably blown on the terminal end of the stem glass. The procedure described in U. S. Patent No. 2,346,470 can desirably be used, the terminal end of the stem being touched against the surface of a mass of molten electrode glass to withdraw a small adhering gob of the molten glass which, following cooling to a suitable glass-blowing temperature, can then be blown into the substantially hemispherical form having a sphericity within the limits previously set forth. This method is desirable for many reasons, among which is that it permits selective blowing of the pH-sensitive glass. In this connection, the method substantially eliminates blowing of the stem glass and restricts the blown portion substantially to the pH-sensitive glass even though the stem glass may have a working or softening temperature less than the electrode glass, as described in the patent supra. The resulting dome can be made to have a thickness up to 0.5 mm. and upon occasion even up to 1 mm. depending upon the diameter of the terminal portion of the stem, the glass temperature, viscosity and surface tension, the thickness of the stem wall, etc.

The glass of the tubular stem which bonds to the pH-sensitive electrode glass should be one which has a coefficient of expansion properly commensurate with the coefficient of the electrode glass from which the dome is formed, following knowledge in this art. The glass of the stem 11 should have a much higher electrical resistivity than the glass of the dome 12, the ratio of specific resistivity being preferably in excess of 100,000. In practice, the glass of the stem 11 can be the stem glass commonly employed in the manufacture of glass electrodes, such as a potash lead glass like Corning 001 or 012.

As to the composition of the electrode glass, any pH-sensitive glass can be employed and will result in electrodes of unexpectedly increased strength as compared with prior spherical electrodes having sphericities of .80–.95. The particular composition of the electrode glass will usually be chosen with reference to the properties desired of the electrode, the manner of forming the dome 12 and the minimum operating temperature of the electrode. Suitable glass compositions are known in the art for manufacture of commercially satisfactory electrodes in accordance with the invention and providing domes ranging in diameter from less than 1 mm. up to more than 10 mm.

One of the important aspects of the invention is the increase in strength of the glass electrode 10, particularly in and adjacent its pH-sensitive portion, occasioned primarily by the new design of the tip of the electrode. Most commonly in prior practice, the bulbous or enlarged portion 14 has constituted the bulb or a spherical bulb has been blown thereon, the bulb being formed of electrode glass and the junction between the electrode glass and the stem glass being at or just below the sealing substance 23. Spherical bulbs of electrode glass have also been blown on the end of a stem of smaller diameter than the bulb, the stem being either cylindrical to the spherical bulb or tapering inwardly thereto. In such prior electrodes, there has been a disconformity in size at the junction of the stem and the bulb, giving rise to an exposed upper surface of the bulb which extends inwardly to the stem as a segment of a sphere. The presence of such an exposed upper surface has been found materially to weaken the electrode against impact or by a steady pressure applied against the tip of the bulb. The present invention eliminates such an exposed upper surface and any large constriction at the junction of the stem and the bulb.

This is accomplished by using a pH-sensitive membrane of particular shape attached to a stem having a terminal portion of substantially the same diameter. In accordance with the invention, the membrane is in the shape of a spheroidal segment having an altitude (measured from the junction plane A—A to the outer surface of the bulb) which is from about .4 up to .65 of the longitudinal axis of the spheroid. Usually the membrane is a segment of a sphere, preferably substantially a hemisphere, having an altitude which is about .4 up to .65 of the diameter of the spherical segment. Such sphericities give unexpected increases in strength and permit the manufacture of glass electrodes in which the diameter of the substantially hemispherical bulb 12 can range from less than 1 mm. up to several mm.

The dome 12 extends arch-like across the terminal end of the stem 11 and the increased strength of the electrode arises largely from the arched nature of the pH-sensitive membrane, as compared with the conventional spherical bulbs. Pressure applied against the end of the dome 12 results in a force pattern in the glass material different than if the glass is blown to a bulb of a sphericity of .80–.95, as was the prior practice. An attempt to illustrate this has been made in Figs. 3A and 3B of the drawing.

Fig. 3A represents an upturned spherical bulb 59 of a conventional type, shown as having a sphericity of about .85. A force F applied to the tip tends to enlarge the diameter of the bulb adjacent its mid plane B—B, as suggested by the opposed force arrows 60, establishing tension forces in the bulb near this plane. All glasses are comparatively weak in tension even though they have high strength in compression. The tension forces near the plane B—B undoubtedly account in part for the relatively low strength of spherical bulbs when the force F is applied, whether this be a pressure or an impact force. Additionally, bending stresses are set up by force F at the junction 61 of the bulb and the stem, these bending forces also contributing to fragility due to the fact that glass has little strength against bending. Ultimately, the force F results in opposed longitudinal forces in the stem, indicated by the arrows 62 but these are compressive forces and the stem is usually well able to withstand them, as distinct from the tension and bending forces in the spherical bulb.

In Fig. 3B there is diagrammatically shown a dome 65 blown in accordance with the invention and having a sphericity of about .4. Here, a force F' applied to the tip will result primarily in compressive forces within the membrane, with little or no tension forces and with less bending forces at the stem junction than is the case in the form of Fig. 3A. There is a much smaller tendency for the glass to enlarge near the junction plane C—C and any minor tension forces are resisted by the stem which is usually of thicker glass. The dome 65 is largely in compression just as a structural arch is largely in compression when transmitting a load to its foundation.

Another factor contributing to the increased electrode strength is the feature of the embodiment of Figs. 1 and 2 of the present invention that the walls of the terminal portion of the stem 11 extend substantially tangential relative to the base zone of the dome 12, avoiding any angle at this point as in conventional electrodes and avoiding any substantial constriction or annular recess adjacent the junction of the two glasses. Due to the manner of blowing, there may be a small annular groove or depression adjacent the junction, as suggested by the numeral 49 of Fig. 2. However, this groove is not necessarily present and does not substantially weaken the electrode in any way comparable to that obtaining with the bulb neck of conventional electrodes.

Another factor contributing to the high comparative strength of my new glass electrodes is that the thickness of the membrane of the dome 12 is more uniform than would be the case with a spherical bulb. In blowing spherical bulbs of a sphericity of .80–.95, the extreme tip of the sphere tends to become thinner than the region next to the junction with the stem glass. With a dome of substantially hemispherical shape, however, the difference in thickness at the two points can be kept much smaller.

When employing the blowing technique of said Patent No. 2,346,470, conventional electrodes having spherical bulbs of a sphericity of .85–.95 and having a diameter of 8–12 mm. will have a thickness of about 0.06–0.10 mm. By this blowing technique, it is difficult to blow such spheres as thick as 0.15 mm. With spheres having a sphericity of .70–.80 and of a diameter of 8–12 mm., the thickness will be typically .10–.15 mm., but may be as low as .06 mm. or possibly as high as .20 mm.

With substantially hemispherical domes having a sphericity of .50–.65, the membrane thickness will depend to some extent upon the diameter thereof but the preferred thickness range for heavy duty commercial electrodes is about .1–.2 mm. It is possible to blow such substantially hemispherical bulbs as thin as .05 mm. up to about .4 to .5 mm. For commercial purposes, substantially hemispherical domes of a sphericity of about .4 up to .65 can be blown to a thickness of about .2 mm. and are virtually unbreakable if the diameter is 8 mm. or less. A thickness of .15–.25 mm. with a diameter of about 5 mm. or less assures that the bulb will be at least as strong as the stem.

As the substantially hemispherical domes of my invention are usually of smaller diameter than conventional electrodes, with corresponding decrease in surface area both because of decreased diameter and decreased sphericity, the electrical resistance of the bulb will be somewhat higher than with conventional electrodes of the same kind of glass. For this reason, it is usually desirable to employ a relatively low resistance electrode glass, usually a glass of specific resistivity no more than that of Corning 015, i. e., about $3 \times 10^{10}$ ohm-cm. at 25° C. Other glasses of lower specific resistivity are shown in the published literature and may desirably be used in making electrodes with domes of very small diameter or in making electrodes to be used below room temperature.

Comparative tests have been made as to the relative strengths of the aforesaid substantially hemispherical glass electrodes, as compared with conventional spherical-bulb electrodes. In the pressure tests to be discussed, the bulbs were pushed against a suitable surface until they broke, the pressure being usually applied by equipment capable of exerting a 70-lb. pressure. It was found that the use of a soft surface, such as wood, in general yields higher and more consistent values for the breakage strength than a hard surface, such as glass, breakage by pressure against such a hard surface depending upon the exact stress pattern at the point of contact. Average results from the pressure tests were as follows:

When electrode bulbs are blown on stems of equal diameter and using equal masses of pH-sensitive glass, a comparison of bulbs blown to substantially spherical form on the one hand, and to substantially hemispherical form on the other, may be made as follows: Typical spherical glass electrodes of 8 mm. diameter, representing commercial electrodes, would withstand only 3–11 lbs. pressure against wood and about the same against glass. On the other hand, substantially hemispherical commercial electrodes of my invention were substantially stronger. Such electrodes having 8 mm. domes would invariably withstand more pressure against wood than could be applied with the aforesaid apparatus (70 lbs. pressure). Other equipment proved that such electrodes can withstand a pressure as high as 150 lbs. or higher without breakage. Smaller commercial glass electrodes made in accordance with the invention and with domes of about 5 mm. are still stronger.

Such static-pressure tests are of interest in connection with penetration-type electrodes. However, the impact strength of a glass electrode is also of interest and tests thereof were made as follows: The impact strength tests consisted in dropping electrodes with stems of uniform weight vertically and tip down upon suitable surfaces, increasing the distance of fall until fracture occurred. Here again, the hardness of the surface affects the results, softer surfaces yielding higher and more consistent values for impact strength. Dropping the electrodes of the present invention upon smooth concrete provides a rather spectacular test in that a 5-inch stem with a 5 mm. hemispherical dome has been observed to bounce after a 3-ft. fall. However, small irregularities in such a surface and highly localized stresses make test results on so hard a surface somewhat variable, wherefore, the tests hereinafter reported were made by dropping the electrodes, tip down, on a sheet of compressed hard-surfaced cellulose fiber board ("Masonite") and covered with 1/32" rubber sheeting.

In the impact tests, a large number of electrodes with uniform stems and with membranes of various sizes, shapes and sphericities, but all of the same glass, were dropped from increasing heights until they broke. Such tests show the following average results:

As compared with spherical-bulb electrodes (sphericity .85), glass electrodes each having a substantially hemispherical membrane of the same thickness and diameter as the spherical bulbs showed more than about 2.4 times the strength with sphericities of .60 and about 3.4 times the strength with sphericities of .50.

If membrames are blown upon stems of the same diameter, with the same weight of the same kind of electrode glass, one of the membranes being a sphere (sphericity .85) and the other substantially a hemisphere (sphericity .60), the hemisphere will have over 4 times the impact strength of the sphere. If two such electrodes, one spherical and one substantially hemispherical, are blown to have the same membrane diameter upon suitable stems (that for the sphere having about ¾ the diameter of the intended sphere, which is also the diameter of the intended hemisphere and of the stem upon which it is to be blown), the substantially hemispherical dome will have an impact strength about 7.5 times that of the spherical bulb, this representing more nearly the comparative strengths of commercial electrodes made in accordance with the invention, as compared with the electrodes they replace. In the last comparison, if the sphericity of the hemisphere is .5 instead of .6, the ratio of impact strengths is about 13.5. For commercial purposes substantially hemispherical electrodes of .2 mm. thickness are nearly unbreakable if the diameter is 8 mm. or less. With diameters of about 5 mm. and thicknesses of about .15 to .25 mm., the dome will be at least as strong as the stem.

In general, the invention permits the manufacture of glass electrodes with membranes as strong as or stronger than the glass stem. With electrodes designed in accordance with the invention, the stem will usually fracture before the dome or the dome and the stem will fracture together, but with properly made electrodes the dome has resisted selective fracture in pressure and impact tests. The electrodes are so sturdy that they can be safely used as stirring rods while measurements of pH are being taken. They are also so sturdy that they can be used safely for penetration testing and for insertion into body orifices. Additionally, the small-size electrodes permit highly localized determination of pH.

The exemplary embodiments herein described will guide those skilled in the art to the design of other similar electrodes within the scope of the invention and it is to be understood that the invention is not limited to the exact examples given nor to the exemplary modes of manufacture.

This is a continuing application of my application filed August 24, 1949, Serial Number 112,106, entitled "Glass Electrodes," now abandoned.

I claim as my invention:

1. As an article of manufacture, a glass electrode for pH measurements characterized by having a high-strength blown bulbous portion at the end of a tube of stem glass, said blown bulbous portion comprising a membrane of pH-sensitive glass fused to a terminal portion of said stem glass at an annular junction zone, the sphericity of the total blown bulbous portion being between about .4 and .65, such sphericity being the ratio of the external area of said blown bulbous portion to that of a sphere of the same diameter, said junction zone being a zone of compositional discontinuity as between the glasses on opposite sides thereof, no substantial portion of said tube of stem glass above and close to said junction zone being substantially smaller in external diameter than the external diameter of said membrane in the plane of said annular junction zone.

2. A glass electrode as defined in claim 1 in which said blown bulbous portion consists substantially exclusively of a cupped membrane of said pH-sensitive glass blown on said terminal portion of said tube of stem glass and fused to such terminal portion at said annular junction zone.

3. A glass electrode as defined in claim 2 in which said junction zone is a zone of geometrical discontinuity as between the external surfaces of said membrane and said terminal portion of said tube of stem glass.

4. A glass electrode as defined in claim 1 in which said tube of stem glass includes a body portion above said annular junction zone, and in which the external diameter of said body portion is larger than the external diameter of said membrane measured in the plane of said annular junction zone.

5. As an article of manufacture, a high-strength envelope for a glass electrode for pH measurements, said envelope comprising: a tubular stem providing a terminal end of a first glass composition; and a thin cupped membrane formed of a pH-sensitive glass of a second glass composition different from said first glass composition and having a base fused to said terminal end at a junction plane, said cupped membrane being substantially a segment of a sphere, the ratio of the altitude of such spherical segment to the diameter thereof being from about .4 up to .65, said altitude being measured from said junction plane to the extremity of the convex surface of said cupped membrane, the diameter of said spherical segment being the diameter of the sphere of which said cupped membrane is a segment, no portion of said tubular stem above and close to said junction plane being substantially smaller in external diameter than the external diameter of said cupped membrane measured in said junction plane.

6. An article of manufacture as defined in claim 5 in which said membranous dome is blown from a molten mass of said glass of said second composition adhering to said terminal end when the same is touched to and withdrawn from the surface of a molten body of such glass.

7. As an article of manufacture, a high-strength envelope for a glass electrode for pH measurements, said envelope comprising: a tubular stem providing a terminal end of a first glass composition; and a thin cupped membrane formed of a pH-sensitive glass of a second glass composition different from said first glass composition, said cupped membrane having a base fused to said terminal end at a junction plane, said cupped membrane being substantially a segment of a sphere having a sphericity from about .4 up to .65, the diameter of said cupped membrane being between about 1 mm. and 1 cm., the average thickness of said cupped membrane being within the range of about 0.05–1.0 mm., no portion of said tubular stem closely adjacent said cupped membrane being substantially smaller in external diameter than the diameter of said cupped membrane.

8. A glass electrode as defined in claim 8 in which said cupped membrane has a diameter of about 1–8 mm. and an average thickness greater than about .1 mm. and less than about .5 mm.

9. A glass electrode as defined in claim 7 in which said pH-sensitive glass has a specific resistivity less than $3 \times 10^{10}$ ohm cms. at 25° C.

10. A glass electrode as defined in claim 7 in which the glass of the tubular stem has a specific resistivity at least one hundred thousand times that of said pH-sensitive glass.

11. As an article of manufacture, a high-strength glass electrode envelope for pH measurements, said envelope comprising: a tube of stem glass having a bulbous portion tapering inwardly to and terminating in a terminal portion ending in an annular edge; and a membranous dome of pH-sensitive glass of different composition than the glass of said terminal portion blown on said terminal portion and fused to said annular edge at a junction zone in the plane of said annular edge, said dome arching across said annular edge and being a spheroidal segment having an altitude measured from the tip of said dome to the plane of said junction zone within a range of about .4 up to but no greater than .65 of the longitudinal axis of the corresponding spheroid, said altitude and longitudinal axis being measured to the external surface of such spheroidal segment, said junction zone being a zone of compositional discontinuity as between the glass compositions of said membranous dome and said terminal portion.

References Cited in the file of this patent

UNITED STATES PATENTS

| | | |
|---|---|---|
| 2,311,977 | Coleman | Feb. 23, 1943 |
| 2,346,470 | Cary et al. | Apr. 11, 1944 |

OTHER REFERENCES

"Coleman pH Electrometers," copyrighted in 1917 by Coleman Electric Co., Maywood, Ill, page 11.